Patented Dec. 27, 1949

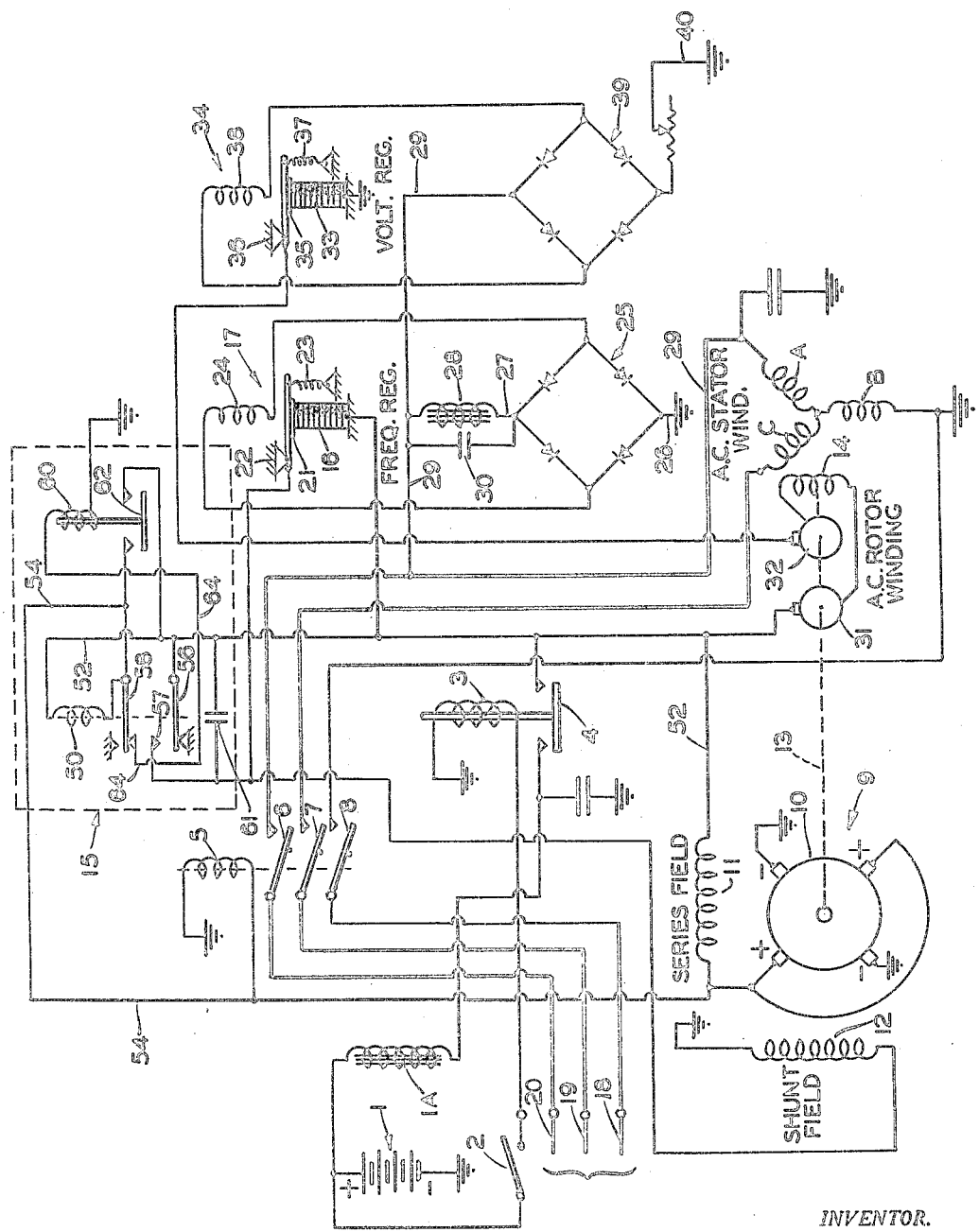

2,492,527

UNITED STATES PATENT OFFICE 2,492,527

STARTING CONTROL MEANS FOR MOTOR GENERATORS

Harold G. Haas, Belleville, N. J., assignor to Bendix Aviation Corporation, Teterboro, N. J., a corporation of Delaware Application March 9, 1949, Serial No. 80,535

5 Claims. (Cl. 322—16)

1

The present invention relates to improvements in electrical regulating systems for a motor-generator or inverter of a type such as disclosed in U. S. application Serial No. 725,252, filed January 30, 1947 by Evan S. Smith.

An object of the invention is to provide a novel control means for effecting the starting of such a motor-generator so as to effect full motor shunt field and motor series field to provide improved starting characteristics to minimize the time of peak starting current and reducing arcing.

Another object of the invention is to provide a relay coil connected across the motor series field to operate relay contacts which control a series field shorting relay and other relay contacts which control a motor shunt field so as to provide full motor shunt field and series field during initial starting and after which the series field is shorted out of operation and a carbon pile resistor is cut into the control circuit to regulate the motor shunt field.

Another object of the invention is to provide a novel relay circuit means to effect both the control of a carbon pile regulator for the motor shunt field and operation of the motor series field and in which the control relay further serves to affect means to shunt out of operation the control winding of the relay as well as the series field upon the motor of the inverter reaching operating speed.

Another object of the invention is to provide a relay having a control winding connected across the series field winding of the motor so as to respond to the voltage drop across the field resulting upon an inrush of current across the field during initial starting to actuate suitable relay switch elements to shunt the carbon pile regulator out of operation and open a circuit for a second control relay winding; while as soon as the motor starts to accelerate and the high motor inrush of current decays to near running value, the relay switch elements are released to their original position at which the carbon pile regulator for the shunt field is placed in operation and a circuit for the second control relay winding is closed to actuate another relay switch to shunt the series field winding and the first mentioned control winding out of operation.

These and other objects and features of the invention are pointed out in the following description in terms of the embodiment thereof which is shown in the accompanying drawing. It is to be understood, however, that the drawing is for the purpose of illustration only, and is not designed as a definition of the limits of the invention, reference being had to the appended claims for this purpose.

The drawing is a diagrammatic showing of a system embodying the invention.

In the arrangement shown in the drawing, there is provided a source of direct current 1 which is connected through a switch 2 to an electromagnetic winding 3 which controls a starting switch 4 normally open. The switch 4 is biased to a closed position upon energization of the winding 3 so as to close a main D. C. input circuit, including a filter choke 1A of conventional type for preventing radio interference.

There is further provided a transfer relay winding 5, which controls line switches 6 and 7 and 8. Upon de-energization of relay 5, switches 6 and 7 and 8 are biased to an open position.

When switch 2 is open, starting relay coil 3 is de-energized with the result that switch 4 opens and thereby disconnects the D. C. source of electrical energy 1 from a D. C. motor indicated generally by the numeral 9 and having an armature winding 10, series winding 11 and shunt field winding 12 of conventional type.

The motor 9 drives through a shaft 13, an exciting winding 14 of an alternator having three phase stator windings A, B and C.

The transfer relay winding 5 is connected across the armature winding 10 of the motor 9. Thus, the closing of the starting switch 4 by energizing the winding 3 connects the D. C. source 1 to the armature winding 10 and the series field winding 11 of the motor 9. Due to the starting inrush of current through series field winding 11, the voltage across the armature 10 is too low to cause transfer relay winding 5 to actuate relay switches 6, 7 and 8 until the armature 10 is nearly up to speed.

Until the operating speed of the motor 9 is nearly reached, it is desirable to keep the full current in the shunt field winding 12 of the motor 9. Hence, a relay mechanism 15 is arranged so as to shunt out of operation a variable resistance or carbon pile element 16 of a frequency regulator 17 during initial starting. Upon the opening of the relay mechanism 15 the variable resistance 16 is connected in series with the shunt field 12 of the motor 9 and the source of electrical energy 1 as will be explained.

When the speed of the motor has increased to near operating speed, the transfer relay switches 6, 7 and 8 are closed by action of relay winding 5 which is energized by the rise in voltage across the armature 10 upon an increase in motor speed. The transfer relay winding 5 thus connects a suitable A. C. load, not shown, at lines 18, 19, and 20 to the alternator stator windings A, B and C upon the motor speed reaching near operating speed.

The carbon pile regulator 17 may be of a type disclosed and claimed in the U. S. Patent application Serial No. 612,691, filed August 25, 1945 by William G. Neild, now U. S. Patent No. 2,481,771.

The frequency regulator is shown diagrammatically as including an armature 21, pivoted at 22 and biased under tension of spring 23 in a direction tending to decrease the resistance of the pile 16 and thereby increasing the energization of the shunt field 12 so as to effect a decrease in the speed of the motor 9.

An electromagnetic winding 24 biases the armature 21 in a direction opposing the spring 23 and tending to increase the resistance of the carbon pile 16 so as to decrease the energization of the shunt field 12 and thereby increase the speed of the motor 9.

The control winding 24 is connected across the output of a rectifier 25. The rectifier 25 has A. C. input connections 26 and 27. The input connection 26 is ground connected to the grounded winding B of the alternator winding. The opposite input connection 27 of the rectifier 25 is connected through an iron core reactance or frequency sensitive choke coil 28 and a conductor 29 to the winding A of the alternator. A capacitor 30 shunts the choke coil 28 to increase the sensitivity of the coil 28.

The series field 11 of the motor 10 tends to increase the difficulty of regulating the speed of the motor 10, but the same is needed to provide a desired starting characteristic to the motor 10.

Therefore, upon the speed of the motor 10 approaching its normal operating range the relay mechanism 15 shunts the series field 11 out of operation and opens the shunt circuit for the frequency regulator 17 so as to permit the frequency regulator 17 to be placed in operation.

At a constant output voltage of the alternator windings A, B and C the current energizing the winding 24 tends, due to the action of the frequency sensitive choke coil 28 to decrease upon an increase in the regulated frequency and to increase upon a decrease in the regulated frequency. This action in turn regulates through the carbon pile 16 the speed of the motor 10 by varying the excitation of the shunt field winding 12 so as to maintain the output frequency of the alternator substantially constant.

The exciting winding 14 is connected to slip rings 31 and 32. The ring 31 is connected by a suitable conductor to one contact of the starting switch 4, while the ring 32 is connected by a suitable conductor to one end of a variable resistance or carbon pile element 33 of a voltage regulator 34. The opposite end of the carbon pile element 33 is grounded so that upon the closing of the starting switch 4 the source of electrical energy 1 is connected through the variable resistance 33 to the exciting winding 14 of the alternator.

The carbon pile regulator 34 may be of a type disclosed and claimed in the U. S. Patent application Ser. No. 612,691, filed August 25, 1945 by William G. Neild, now U. S. Patent No. 2,481,771.

The voltage regulator is shown diagrammatically as including an armature 35, pivoted at 36 and biased under tension of spring 37 in a direction tending to decrease the resistance of the pile 33 and thereby increasing the energization of the exciting winding 14 so as to effect an increase in the voltage output of the alternator.

An electromagnetic winding 38 biases the armature 21 in a direction opposing the spring 37 and tending to increase the resistance of the carbon pile 33 so as to decrease the energization of the exciting winding 14 and thereby decrease the output voltage of the alternator.

The control coil 38 is connected to the output of a rectifier 39 having an A. C. input connected through conductor 29 and a grounded connection 40 across the windings A and B of the alternator stator winding 15. Thus the regulator 34 tends to regulate the output voltage of the alternator.

From the foregoing, it will be seen that upon a decrease in the load across the lines 18, 19 and 20, the output voltage of the alternator tends to rise, which tendency is but partially overcome by the voltage regulator 34 and the motor 9 tends to speed up. When the motor 9 tends to speed up, the current in the frequency regulator coil 24 tends to decrease so as to effect a decrease in the motor speed.

It may be noted that the current in the frequency regulator coil 24 decreases upon an increase in output frequency of the alternator over the working range of the regulator 17, while an opposite action is effected upon a decrease in the output frequency of the alternator.

The mechanism 15 includes a novel control relay circuit means for effecting the starting of the motor 10 with a full motor shunt field 12 and series field 11 after which the series field 11 is shorted out of operation and a carbon pile resistor 16 is cut into the control circuit to regulate the motor shunt field 12.

The foregoing is effected by providing a main relay control winding 50 connected by lines 52 and 54 across the series field winding 11 of the motor 9 so as to respond to the voltage drop across the winding 11 upon an inrush of current across the winding 11 in initial starting. Such energization of the winding 50 causes the relay switch element or spring arm 56 to close a contact 57 and thereby shunt the carbon pile 16 out of operation; and a second switch element or spring arm 58 to open a circuit for an auxiliary relay winding 60. A condenser 61 is connected across the switch element 56 and contact 57 to eliminate arcing upon the opening of contact 57 by the switch 56.

The auxiliary relay 60 operates a switch element 62 controlling contacts connected across the lines 52 and 54 so as to shunt the series field 11 out of operation upon closure of the switch element 62.

The relay winding 50 is rapidly responsive to the inrush of starting current so as to open switch 58 before the auxiliary relay winding 60 becomes sufficiently energized to close the shunting switch element 62.

However, as soon as the motor 9 starts to accelerate and the high motor inrush of current decays to near running value the resulting decrease in the energization of relay winding 50 permits the relay switch elements 56 and 58 to be released under spring tension to the original position shown. In such position, the carbon pile regulator element 16 for the shunt field 12 is placed in operation by the opening of switch 56 and a circuit for the auxiliary relay 60 is closed by switch 58 so as to connect conductor 54 through a conductor 64 to energize relay winding 60. Energization of relay winding 60 actuates the switch 62 to a closed position shunting the series field winding 11 and relay winding 50 out of operation; while the speed of the motor 9 is regulated during normal operation through the shunt field winding 12 and carbon pile element 16 without the adverse effect of series field winding 11 which is shunted out of operation by switch 62.

Moreover, since the main control winding 50 is also shunted out of operation by the closure of auxiliary relay switch 62 the series field winding 11 will not be connected back into operation until switch 2 is opened and relay winding 60 deenergized. However, upon initiating the starting of the motor 9 by the closure of switch 2 the series field winding 11 will once again be in an operating relation to provide the desired starting characteristic to the motor 10.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. In a system of the character described, the combination comprising an alternating current generator, a motor for driving said generator, series and shunt field windings for said motor, means for regulating the energization of said shunt field winding in response to the output frequency of said generator, a relay mechanism including control means effective during motor starting to shunt said regulating means out of operation and permit full energization of the series and shunt fields, said control means effective upon the motor accelerating to an approximate normal running condition to shunt said series field winding out of operation and permit operation of the regulating means for the shunt field winding.

2. The combination defined by claim 1 in which said relay mechanism includes a main control winding connected across said series field winding and operatively affecting said control means, said control winding being held in an inoperative condition by said control means upon the shunting of said series field winding.

3. In a system of the character described, the combination comprising an alternating current generator, a motor for driving said generator, series and shunt field windings for said motor, means for regulating the energization of said shunt field winding in response to the output frequency of said generator, a relay mechanism responsive to the voltage drop across the series field winding, a first circuit to shunt said regulating means out of operation, switch means operatively controlled by said mechanism to close said first shunt circuit upon initial starting of the motor, a second circuit to shunt said series field winding out of operation, a second relay mechanism to control said second shunt circuit, a third circuit to control energization of said second relay mechanism, said switch means opening said first shunt circuit and closing said third circuit upon said motor after initial starting accelerating to a speed approximating a normal running condition so as to place said regulating means in an operative relation to said shunt field winding and cause said second relay mechanism to shunt said series winding out of operation.

4. In a system of the character described, the combination comprising an alternating current generator, an electric motor for driving said generator, a series field winding for starting the motor, a shunt field winding for controlling the speed of said motor, a variable resistance element for regulating the energization of said shunt field winding, an electromagnetic winding for operating said variable resistance element, a rectifier having an alternating current input and a direct current output, said electromagnetic winding connected across said direct current output, a circuit connecting said alternating current input across the output of said generator, said circuit including a frequency sensitive iron core reactance winding to effect energization of the electromagnetic winding in inverse relation to the output frequency of said generator, a relay mechanism including a main control winding connected across said series field winding, relay switch means operated by said main control winding for shunting said variable resistance element while said generator is driven by said motor in starting at a frequency less than a predetermined minimum frequency, and said relay switch means so arranged as to shunt said series field winding and permit operation of said variable resistance element upon the driven speed of said motor exceeding said minimum frequency, the shunt of said series field winding effecting a holding circuit for preventing said main control winding from causing said relay switch means from shunting said variable resistance element so long as said motor continues to run.

5. For use in controlling an electric motor having an armature winding, a series field winding, a shunt field winding, and a regulating means including a variable resistance element to vary the energization of the shunt field winding so as to maintain a predetermined motor speed; a relay mechanism comprising a main control winding to be connected across the series field winding, an auxiliary control winding to be connected across the armature winding, first and second switch elements controlled by said main control winding, said first switch element to close a circuit to effect energization of the auxiliary control winding as upon acceleration of the motor to an approximate normal running conditon and energization of the main control winding decaying to a predetermined minimum value, said second switch element to close a circuit to shunt said variable resistance means out of operation upon initial energization of the series field winding during the starting of the motor, a third switch element controlled by said auxiliary control winding to shunt said series field winding out of operation upon energization of said auxiliary control winding following the afore-noted acceleration of the motor to an approximate normal running condition.

HAROLD G. HAAS.

No references cited.